United States Patent
Heidan et al.

(10) Patent No.: US 9,834,075 B2
(45) Date of Patent: Dec. 5, 2017

(54) ROOF SYSTEM FOR AN AUTOMOTIVE VEHICLE

(71) Applicants: Michael Heidan, Stuttgart (DE); Marius Marquart, Stuttgart (DE)

(72) Inventors: Michael Heidan, Stuttgart (DE); Marius Marquart, Stuttgart (DE)

(73) Assignee: BOS GMBH & CO. KG, Ostfildern (DE)

( * ) Notice: Subject to any disclaimer, the term of this patent is extended or adjusted under 35 U.S.C. 154(b) by 0 days.

(21) Appl. No.: 15/222,546

(22) Filed: Jul. 28, 2016

(65) Prior Publication Data
US 2017/0050502 A1 Feb. 23, 2017

(30) Foreign Application Priority Data

Aug. 21, 2015 (DE) .................... 10 2015 010 796
Dec. 17, 2015 (DE) .................... 10 2015 225 811

(51) Int. Cl.
*B60J 7/057* (2006.01)
*B60J 7/043* (2006.01)
*B60J 7/02* (2006.01)

(52) U.S. Cl.
CPC ............ *B60J 7/0435* (2013.01); *B60J 7/024* (2013.01)

(58) Field of Classification Search
CPC ................................ B60J 7/024; B60J 7/0435
USPC ....................... 296/216.02–216.05, 221–224
See application file for complete search history.

(56) References Cited

U.S. PATENT DOCUMENTS

| | | | |
|---|---|---|---|
| 4,632,449 A * | 12/1986 | Masuda ................ | B60J 7/05 296/221 |
| 5,026,113 A | 6/1991 | DiCarlo et al. | |
| 5,275,461 A * | 1/1994 | Cheron ................ | B60J 7/0435 296/216.03 |
| 5,288,125 A | 2/1994 | Huyer | |
| 6,257,658 B1 * | 7/2001 | Nabuurs ............... | B60J 7/022 296/223 |
| 6,428,093 B1 | 8/2002 | Farmont et al. | |

(Continued)

FOREIGN PATENT DOCUMENTS

DE 298 11 016 U1 12/1999
DE 101 41 845 A1 4/2003

(Continued)

OTHER PUBLICATIONS

European Search Report issued in Application No. 16 18 0083 with English language translation of category of cited documents dated Feb. 13, 2017 (9 pages).

*Primary Examiner* — Dennis H Pedder
(74) *Attorney, Agent, or Firm* — Flynn, Thiel, Boutell & Tanis, P.C.

(57) ABSTRACT

Roof system for an automotive vehicle. A roof system with a roof opening fixed to the vehicle including a movably mounted roof part and at least one deployment and guide mechanism for displacing the roof part, and including a control carriage which is movable by a drive system in a guide track arrangement fixed to the roof, and a front and a rear deployment lever. The control carriage has a front control link, in which a bearing pin of the front deployment lever is guided, wherein the bearing pin projects through the front control link into a lifting slotted link fixed to the roof, which is oriented at least in sections crosswise in relation to the front control link.

18 Claims, 12 Drawing Sheets

(56) References Cited

U.S. PATENT DOCUMENTS

| | | | |
|---|---|---|---|
| 6,669,276 B2 | 12/2003 | Eiermann et al. | |
| 6,890,025 B2 * | 5/2005 | Hanke | B60J 7/02 296/216.08 |
| 7,878,581 B2 * | 2/2011 | Faerber | B60J 7/0435 296/216.03 |
| 8,388,053 B2 | 3/2013 | Kikuchi et al. | |
| 9,376,000 B2 * | 6/2016 | Heidan | B60J 7/024 |
| 2001/0026085 A1 | 10/2001 | Farmont et al. | |
| 2002/0053817 A1 | 5/2002 | Farmont et al. | |
| 2003/0038513 A1 | 2/2003 | Eiermann et al. | |
| 2012/0112499 A1 | 5/2012 | Kikuchi et al. | |
| 2015/0306942 A1 * | 10/2015 | Heidan | B60J 7/024 296/216.02 |

FOREIGN PATENT DOCUMENTS

| | | |
|---|---|---|
| DE | 101 58 174 A1 | 6/2003 |
| DE | 10 2012 223 709 A1 | 6/2014 |
| DE | 10 2013 107 733 A1 | 1/2015 |
| EP | 0 543 427 A1 | 5/1993 |
| EP | 0 555 977 A1 | 8/1993 |
| EP | 2 450 210 A2 | 5/2012 |

* cited by examiner

ROOF SYSTEM FOR AN AUTOMOTIVE VEHICLE

CROSS-REFERENCE TO RELATED APPLICATIONS

This application claims priority from German Patent Application No. 10 2015 010 796.8, filed Aug. 21, 2015 and German Patent Application No. 10 2015 225 811.4, filed Dec. 17, 2015 the disclosures of which are hereby incorporated by reference in their entireties into this application.

FIELD OF THE INVENTION

The invention relates to a roof system for an automotive vehicle, with a roof opening fixed to the vehicle and with a movably mounted roof part for closing and exposing the roof opening, and with at least one deployment and guide mechanism for displacing the roof part between a closed position and at least one open position, said mechanism includes a control carriage which is movable by means of a drive system in a guide track arrangement fixed to the roof, and said mechanism includes a front deployment lever and a rear deployment lever, with the roof part mounted thereon, and said levers are coupled to the control carriage, wherein the front deployment lever is capable of being blocked relative to the rear deployment lever in the longitudinal direction of the guide track arrangement for a ventilation position of the roof part.

BACKGROUND OF THE INVENTION

Such a roof system is disclosed in DE 10 2012 223 709 A1. The known roof system is provided for a vehicle roof of a passenger vehicle. The roof system includes a movable roof part which—as viewed in the longitudinal direction of the vehicle—is connected on each of its opposite longitudinal sides to respective deployment and guide mechanisms which are of identical design and operable in synchronization. Each deployment and guide mechanism has a front deployment lever and a rear deployment lever which are articulated to the roof part. By means of the two deployment and guide mechanisms in opposite roof-sided guide track arrangements the roof part is capable of being transferred from a closed position, in which a roof opening is closed towards the vehicle interior, to a ventilation position, in which the roof part is deployed obliquely rearwards and upwards. From the ventilation position the roof part can be transferred along the longitudinal direction of the vehicle rearwards to an open final position, in which the roof opening is at least largely completely exposed. During the procedure, the movable roof part is shifted rearwards over a stationary roof part of the roof system. The rear deployment lever is coupled to a control lever, whereas the front deployment lever is connected to a guide carriage separate from the control carriage. The guide carriage and the control carriage are displaceable in different guide planes within the guide track arrangement. The guide carriage and the control carriage are capable of being coupled temporarily to each other via a control lever, which lever is capable of being blocked within a stationary latching recess of the guide track arrangement in response to the position of the guide carriage. Said blocking of the guide carriage is necessary in order to transfer the roof part from the closed position thereof to a ventilation position, wherein the control carriage deploys the rear deployment lever upwards, whereas the front deployment lever is retained in a stationary position relative to the longitudinal direction of the guide track arrangement by the control carriage.

SUMMARY OF THE INVENTION

It is the object of the invention to provide a roof system of the type mentioned at the beginning which has a significantly simplified structure as compared to the state of the art.

This object is achieved in that the control carriage includes a front control link, in which a bearing pin of the front deployment lever is guided, wherein the bearing pin projects through the front control link into a lifting slotted link fixed to the roof which extends in a parallel plane to the front control link and is oriented at least in sections crosswise in relation to the front control link. The solution according to the invention allows blocking of the front deployment lever for the ventilation position of the roof part, without need for latching elements. Indeed, said blocking is obtained in the positive mode by moving the control carriage and temporary fixing of the bearing pin of the front deployment lever in the lifting slotted link in that the front control link is intersecting the lifting slotted link and, thus, move-related securing of the bearing pin in the lifting slotted link is allowed. The solution according to the invention needs a reduced number of components and, consequently, there is less space occupied, as compared to the state of the art. The solution according to the invention is advantageous, in particular, in case there is not more than a single deployment and guide mechanism provided in the vicinity of a center of the vehicle of the roof system, which mechanism engages on the roof part in a central location. The solution according to the invention is particularly advantageous in case the roof part has a relatively great width and merely a small roof frame portion remains on the opposite sides of the vehicle roof in order to accommodate the guide track arrangements of the roof system fixed to the roof. According to the invention, the front deployment lever is blocked by the front control link not only in the ventilation position but also in a closed position of the roof part. Furthermore, the front control link is designed such that, upon initiation of an opening move, the front pivot point of the front deployment lever is raised from the closed position of the roof part, whereby necessarily the roof part is raised to a minor extent. This is advantageous with a curved roof front edge of the roof part, since there is a compensating motion for said roof front edge of the movable roof part. As a result, excessively deep downward plunging of the roof front edge is prevented, when the movable roof part is transferred from the closed position to the ventilation position.

In an embodiment of the invention, the control carriage includes at least one rear control link in which at least one control pin of the rear deployment lever is guided. Thus, the control carriage is provided both for control of the front deployment lever and also for control of the rear deployment lever, without need for further carriage components.

In a further embodiment of the invention, two rear control links are provided which are separated from each other and each one guides a respective control pin of the rear deployment lever. Both of the separated and, consequently, divided rear control links are to control a rear section of the roof part upwards to the ventilation position thereof and to secure the roof part in the upwards displaced position, when the roof part is displaced rearwards over a stationary partial section of the roof system.

In a further embodiment of the invention, the front control link and the two rear control links are oriented in a common plane of the control carriage. This allows a very narrow design of the control carriage, whereby the corresponding guide track arrangement of the roof system can also be kept in a narrow shape. Hereby, an enlarged usable width of the movable roof part is possible. This is advantageous, in particular in case that the movable roof part is transparent. Hereby, more light is admitted in the vehicle interior.

In a further embodiment of the invention, the control carriage has a flat profiled section oriented in the vertical and longitudinal directions of the guide track arrangement, and the control links are provided therein. Said flat profiled section is preferably made of metal, in particular made of steel, and produced in one piece. Owing to the fact that the flat profiled section is oriented in the vertical direction, it occupies an extremely small width in the transverse direction of the vehicle, whereby the respective guide track arrangement can also have a very small design. Furthermore, the small width of the flat profiled section oriented in the vertical direction allows an increased width extension of the roof part.

In a further embodiment of the invention, the control links are lengthwise passage slots extending in a planar, rising or falling manner, in response to a predetermined control path of the bearing pin of the front deployment lever or the corresponding control pin of the rear deployment lever. As a result, the passage slots constitute corresponding slotted guide tracks in which the bearing pin and the control pins, respectively, are guided.

In a further embodiment of the invention, the lifting slotted link includes a blocking section extending at least largely in the vertical direction, which intersects the front control link in such a manner that the bearing pin of the front deployment lever is held supported within the blocking section of the lifting slotted link by the control link as long as the roof part is located in the ventilation position. The blocking section represents a section of a slotted guide track of the lifting slotted link oriented in the vertical direction. The blocking section can be oriented in the vertical direction merely partially and, as a result, also include components in the longitudinal direction of the guide track arrangement and, thus, in the longitudinal direction of the vehicle. What is important is merely that there is an intersection relative to the front control link which allows move-related blocking of the bearing pin of the front deployment lever in the lifting slotted link.

In a further embodiment of the invention, the passage slots of the two rear control links are provided with enlargements of the bearing surfaces extending in the transverse direction, which enlargements provide an enlarged resting surface for the control pins. Preferably the bearing surface enlargements are obtained by injection molding on the peripheral regions of the passage slots using synthetic material. In addition to the enlarged resting surface for the control pins in the transverse direction, there is also an improved support in the transverse direction achieved. The synthetic material injection molding is preferably made of polyoxymethylene (POM).

In a further embodiment of the invention, the bearing surface enlargements are provided with a sliding layer, like in particular a synthetic material coating. The synthetic material coating can be realized in the form of the above described synthetic material injection molding.

In a further embodiment of the invention, the control pins are each provided with a sliding head in the vicinity of their end sides facing away from the rear deployment lever, with the diameter of the heads being greater than a corresponding width of the respective passage slot of the rear control links. The sliding heads of the control pins are laterally supported on the flat profiled section of the control carriage in the vicinity of the lateral support surfaces of the bearing surface enlargements and ensure that the control pins are prevented from slipping out of the passage slots in the transverse direction. The term "transverse direction" is meant to be the direction transverse to the longitudinal direction of the guide track arrangements, namely, the transverse direction of the vehicle. Equally, the term "vertical direction" is meant to be the vertical direction of the vehicle, and the term "longitudinal direction" is meant to be the longitudinal direction of the vehicle. The different directions are respectively viewed in the ready for operation, installed condition of the roof system in the vehicle.

Further advantages and features of the invention will become apparent from the claims and from the description below of a preferred exemplary embodiment of the invention which is illustrated with reference to the drawings.

DETAILED DESCRIPTION

Figure 1:
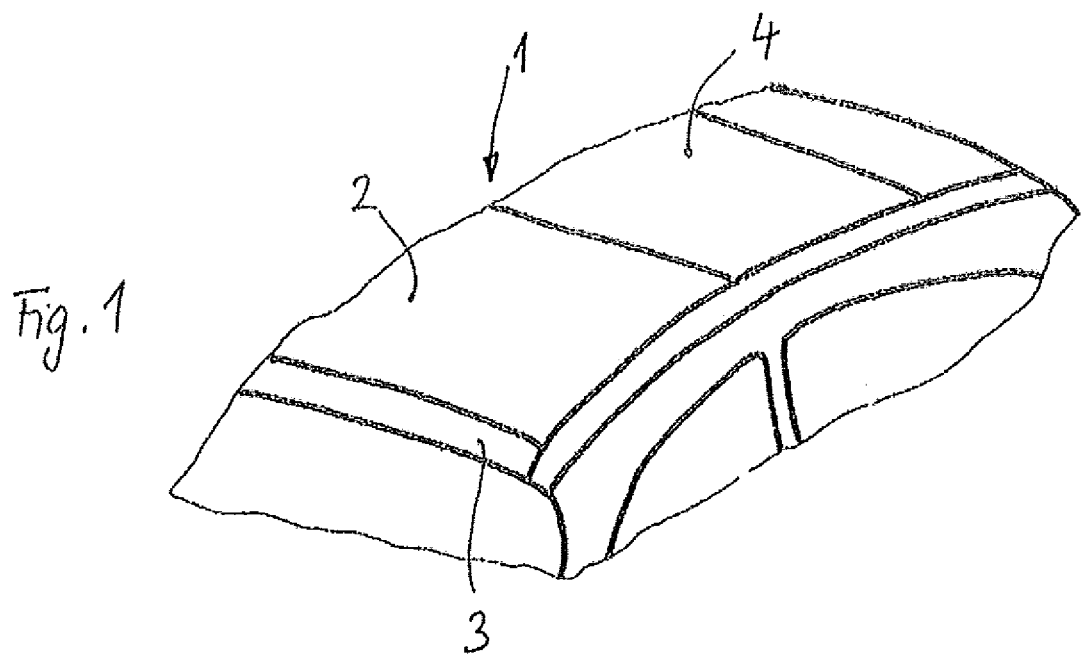
FIG. 1 shows a schematic illustration of an embodiment of a roof system according to the invention in the vicinity of a vehicle roof of a passenger vehicle.
Figure 2:
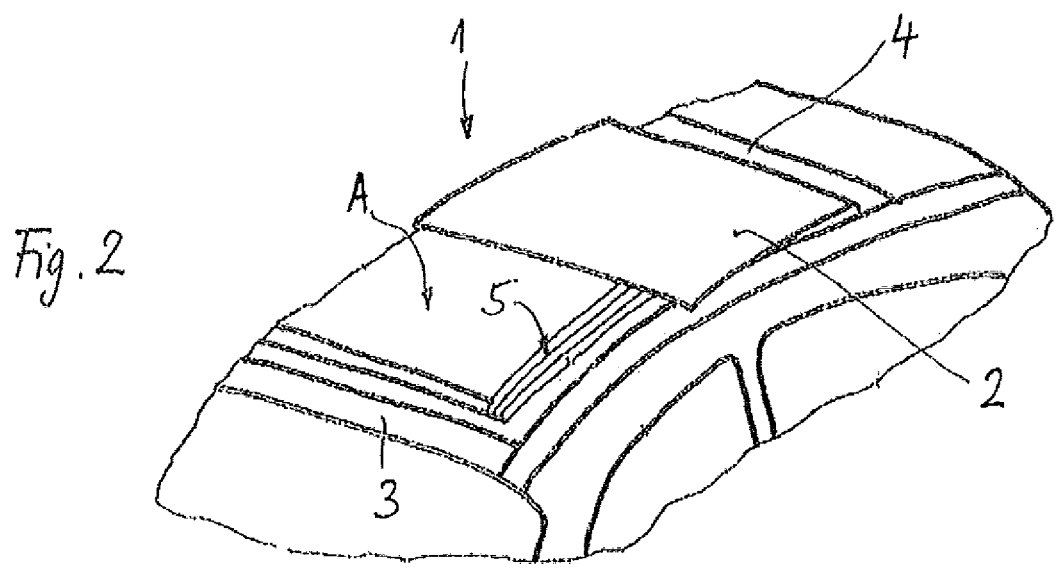
FIG. 2 shows the roof system according to FIG. 1 with a movable roof part transferred to an open final position.

According to FIGS. 1 and 2 a passenger vehicle has a vehicle roof which is provided with a roof system 1. The roof system 1 is installed in the vicinity of the vehicle roof. For that purpose, a large area portion of the vehicle roof is cut out. The roof system 1 is inserted in the cut out region and sealingly connected to the roof supporting structure and the chassis supporting structure of the passenger vehicle in a convenient manner.

The roof system 1 includes a face panel 3 on the front side immediately adjacent to a windshield frame of the passenger vehicle. The face panel 3 is adjoined to the rear by a movable roof part 2 which in the closed position thereof according to FIG. 1 closes a roof opening A which provides access to a vehicle interior of the passenger vehicle. The movable roof part 2 and, thus, the roof opening A is adjoined to the rear, towards a vehicle rear, by a stationary roof portion 4 which is fixedly connected to a supporting frame module of the roof system 1 and, consequently, is disposed stationary to the vehicle roof. In the closed position of the movable roof part 2 the face panel 3, a surface of the roof part 2 and a surface of the roof portion 4 provide an essentially flush adjoining exterior shell for the vehicle roof.

Figure 12:
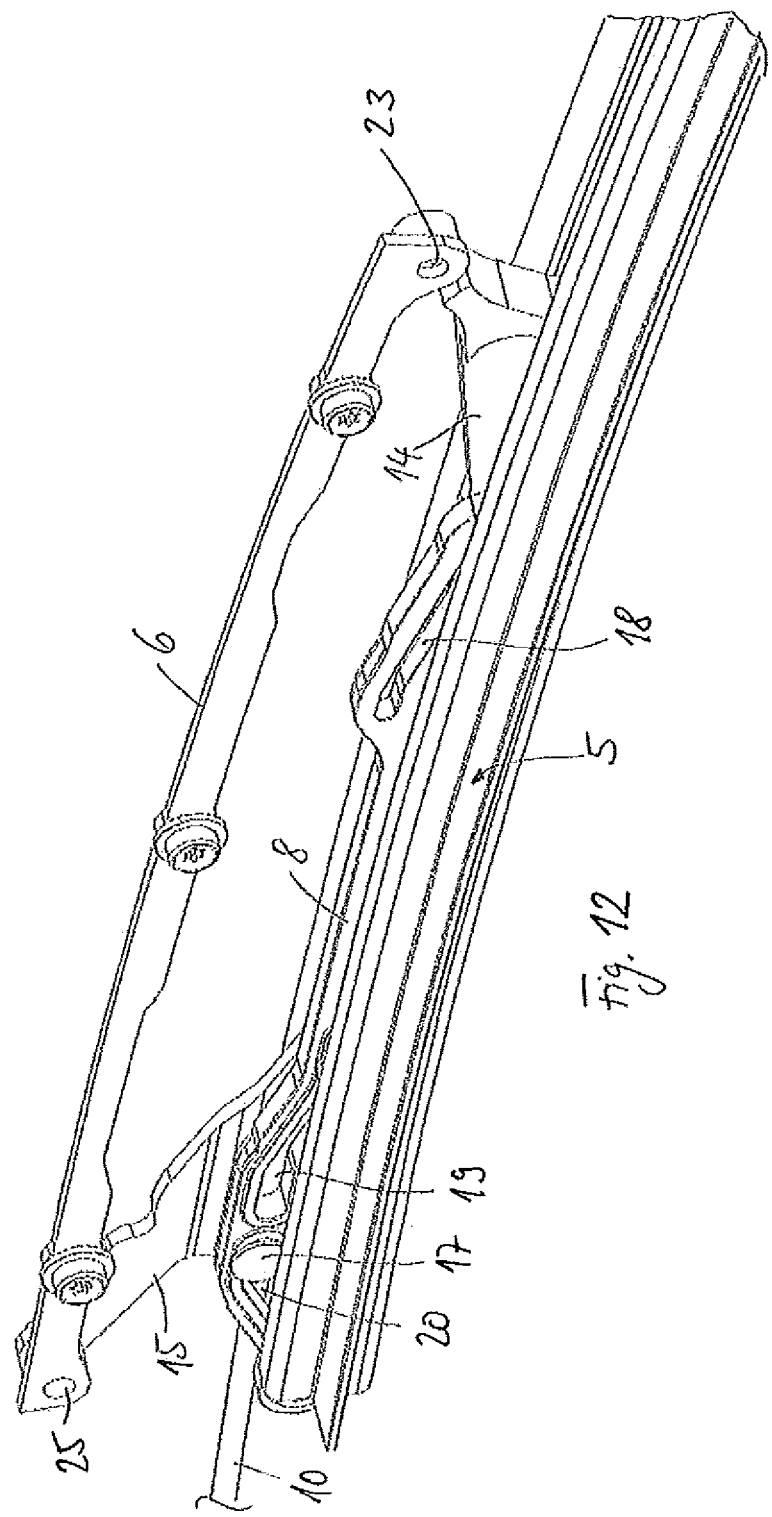
FIG. 12 shows a deployed open position of the deployment and guide mechanism according to FIGS. 8 to 11.
Figure 13:
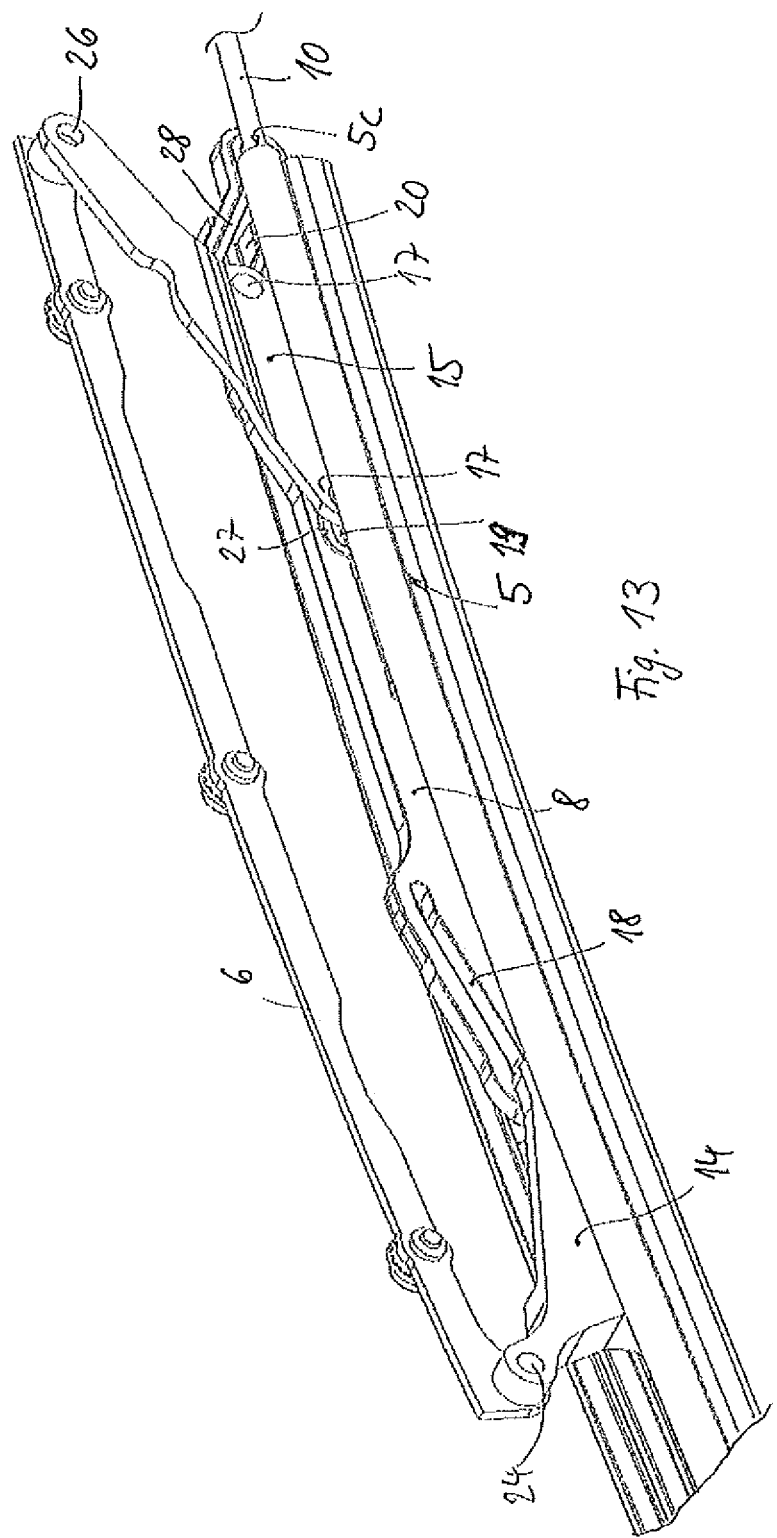
FIG. 13 shows the open position according to FIG. 12 in another perspective illustration.

The supporting frame module of the roof system 1 includes on two opposite longitudinal sides of the roof opening A two guide track arrangements 5 which are at least largely extended over an entire length of the roof system 1 and also extend along the stationary roof portion 4. The two guide track arrangements 5 are for guiding the roof part 2 from the closed position according to FIG. 1 up to the open final position according to FIG. 2. The opposed guide track arrangements 5, where only the headway left guide track arrangement 5 is illustrated in FIG. 2, are mirror symmetrical to a vertical central longitudinal plane of the vehicle, however, otherwise of identical design. For shifting the roof part 2 between the closed position and the open final position, each guide track arrangement 5 is associated with a deployment and guide mechanism, described in more detail below, wherein with reference to FIGS. 3 to 13 merely the headway left hand side deployment and guide mechanism is described in more detail. The deployment and guide mechanism opposed thereto is mirror symmetrical, however, for the rest of identical design in relation to the deployment and guide mechanism as illustrated. Both the deployment and guide mechanisms are driven by a drive system including a central electric motor and two flexible drive transmission cables which are driven by the electric motor in synchronization with each other using an appropriate gearing mechanism. The drive transmission cable 10 installed in the left hand side guide track arrangement 5 is illustrated in a simplified manner in FIGS. 3 and 12, 13. The drive transmission cables are also referred to as flexshafts and include a helical outer sheath to which force is applied in the vicinity of the gearing mechanism by an adequate threaded screw in order to cause longitudinal displacement within the respective guide track arrangement 5. For guiding the drive transmission cable 10, each guide track arrangement 5 has a guiding profile 5c open towards the center of the roof (cf. in particular FIG. 5).

The guide track arrangement 5 has two superimposed guide planes constituted by corresponding track profiles. In a lower guide plane 5a (FIG. 5) a control carriage 8 of the deployment and guide mechanism is guided for lengthwise shifting. In an upper guide plane 5b, extending in parallel above the guide plane 5a, a bearing pin 16 of a front deployment lever 14 of the deployment and guide mechanism is guided. The guide track arrangement 5 has, in the front face end region, a guide extension 9 defining a curved guiding section. The guide extension 9 adjoins the lower guide plane 5a and dislocates the level of the lower guide plane towards the front and obliquely downwards. A lifting slotted link 22 is integrally molded to the guide extension 9, which will be described in more detail below, and is assigned to the upper guide plane 5b.

Figure 3:
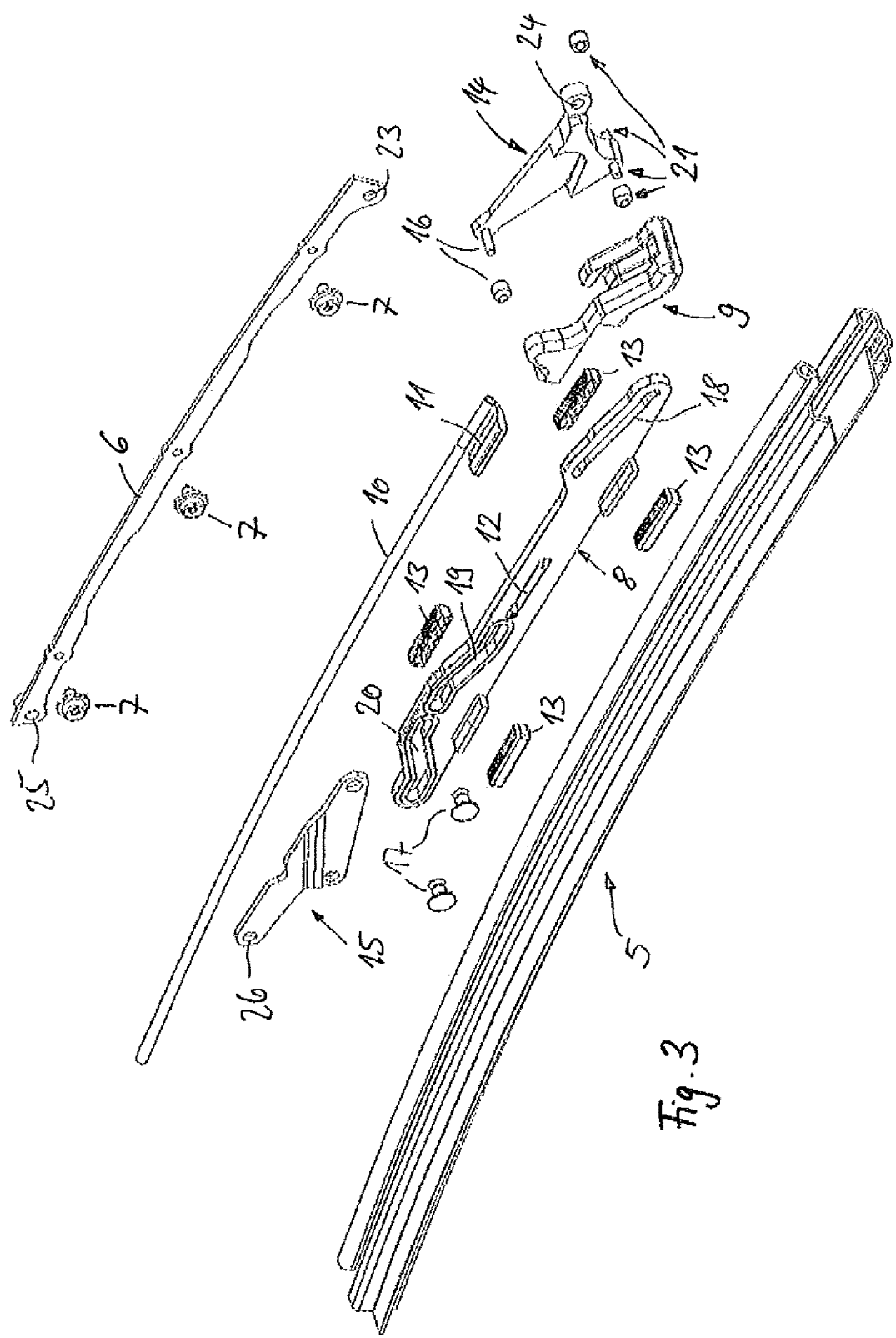
FIG. 3 shows a perspective exploded view of a left guide track arrangement with a left deployment and guide mechanism, in relation to an ordinary headway of the passenger vehicle.
Figure 4:
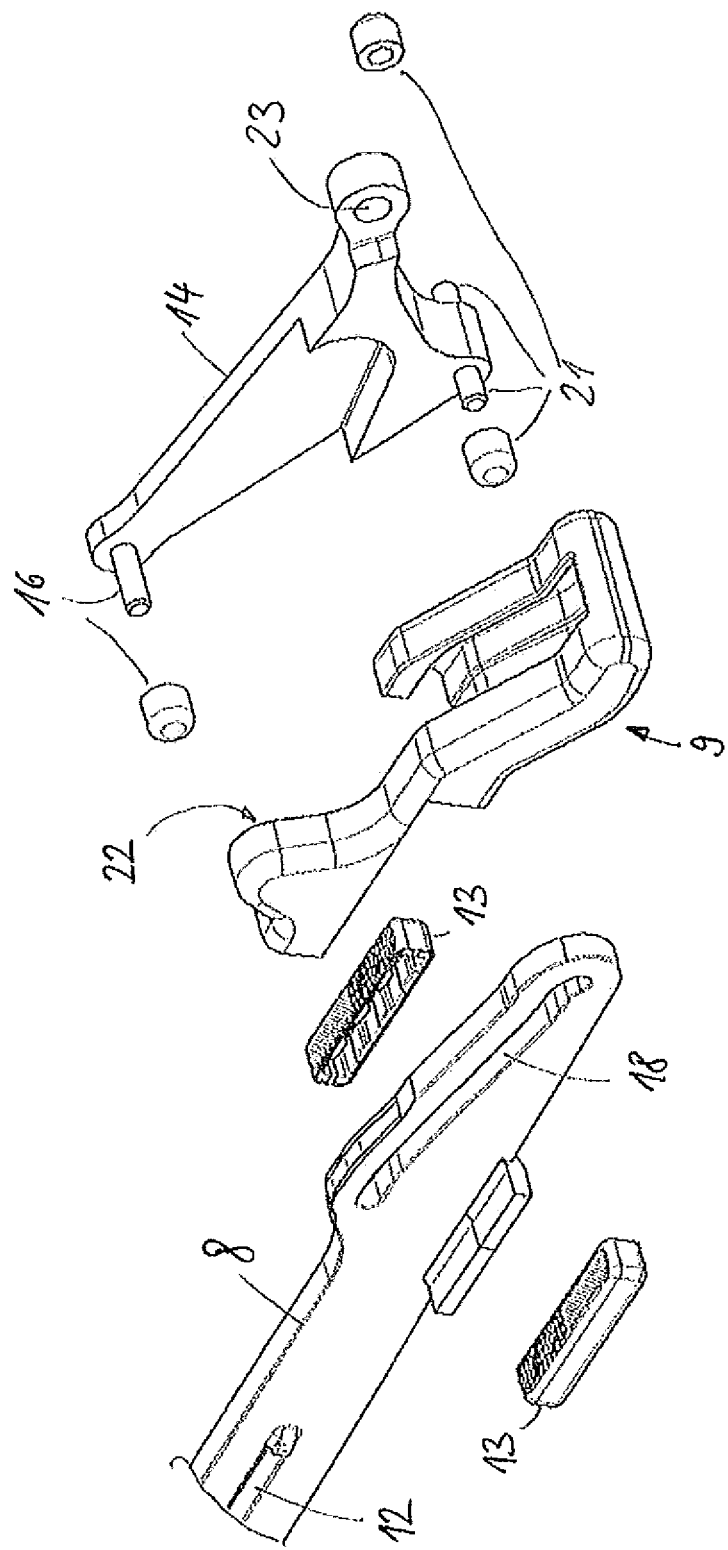
FIG. 4 shows an enlarged exploded view of a detail of the illustration according to FIG. 3.

Above each guide track arrangement 5, the roof part 2 is fixedly connected to a respective dimensionally stable supporting strut 6 by means of screwed connections 7. The respective supporting strut 6 is assigned to a corresponding deployment and guide mechanism. Consequently, the left hand side supporting strut 6, as illustrated in FIG. 3, is assigned to the left hand side deployment and guide mechanism. The supporting strut 6 extends in the longitudinal direction of the roof part 2 and at least largely over an entire length of the roof part 2. On its front face end region the supporting strut 6 is pivotably connected to a joint 24 of a front deployment lever 14 by means of a bearing point 23 and in the vicinity of its rear face end region to a joint of a cantilever arm of a rear deployment lever 15 by means of a bearing point 25. The two pivot axes extending through the bearing points 23 and 25 extend in the transverse direction of the vehicle and, thus, transversely to the guide track arrangement 5 extending essentially in the longitudinal direction of the vehicle. The front deployment lever 14 is integrated in the deployment and guide mechanism using three joint axes spaced from each other in the type of a triangle. In addition to the joint 24 a bearing pin 16, illustrated in more detail below, defines another joint axis and a guide pin 21 defines a third joint axis. The guide pin 21 is for guiding the deployment lever 14 in the guide plane 5a of the guide track arrangement 5 and in the guide extension 9 adjoining the guide plane 5a on the front side. The bearing pin 16 projects inwards from a cantilever arm of the deployment lever 14 towards the center of the vehicle and is guided in the lifting slotted link 22 and in the upper guide plane 5b. Both the bearing pin 16 and the guide pin 21 have sliding heads, not indicated in more detail, to permit secure and low clearance sliding movement in the corresponding guide planes 5a, 5b.

The rear deployment lever 15 likewise has three joint axes extending in parallel to each other in the transverse direction of the vehicle and spaced from each other in the type of a triangle. In addition to the joint 26, said three joint axes are defined by two support pins 17 which traverse the deployment lever 15 and are guided in two rear control links 19, 20 of the control carriage 8, as described in more detail below.

The control carriage 8 is designed as a planar flat profiled section, which is oriented upend and, consequently, extending in the vertical direction and in the longitudinal direction of the guide track arrangement 5. The flat profiled section has a plate-type or strip-type shape and is produced in one piece of metal, in the present case made of steel. The flat profiled section has on each of the opposite longitudinal sides thereof two laterally projecting support sections spaced from each other in the longitudinal direction and each provided with a sliding body 13. The respective sliding body 13 is produced from an appropriate synthetic material and is to allow low-friction sliding guidance for the control carriage 8 in the guide plane 5a of the guide track arrangement 5. For displacing the control carriage 8 within the guide track arrangement 5, the control carriage 8 has a central seat 12, wherein a coupling section 11 of the drive transmission cable 10 is secured in a form-fitting manner. As a result, displacing of the drive transmission cable 10 necessarily causes a corresponding shifting of the control carriage 8 in the guide plane 5a of the guide track arrangement 5. Both the control carriage 8 and the guide pin 21 of the front deployment lever 14 are, consequently, displaceable along the lower guide plane 5a. Also, the guide pin 21 of the front deployment lever 14 can plunge into the oblique and curved front-side guide plane of the guide extension 9 which conforms in alignment with the guide plane 5a towards the rear. The rear control links 19, 20 and the front control link 18 are passage slots in the flat profiled section of the control carriage 8.

The bearing pin 16 of the front deployment lever 14 traverses the front control link 18 of the control carriage 8 and projects into the lifting slotted link 22 opposite to the cantilever arm of the front deployment lever 14. The front control link 18 is provided in a front section of the control carriage 8. Both the front control link 18 and the two rear control links 19 and 20 are disposed in the plane of the flat profiled section of the control carriage 8 oriented in the vertical direction and in the longitudinal direction. The front control link 18 ascends, starting from the front, essentially continuously obliquely rearwards and upwards. The two rear control links 19 and 20 are separated from each other with a short distance. Both the front control link 18 and the rear control links 19, 20 are passage slots provided in the flat profiled section of the control carriage 8 and are open towards the two longitudinal sides of the control carriage 8. The front one of the two rear control links 19, 20 has a planar sliding track section, as viewed from the front, with an obliquely upwards ascending sliding section adjoining thereto, said sliding section passing over to a further horizontally rearwards extending end section, the level thereof being offset upwards in relation to the front section. Accordingly reversed thereto, the rear one of the two rear control links 20 has a front-side sliding section starting on the level of the end-side sliding section of the first rear control link 19 and extending horizontally rearwards. On said front-side section of the second rear control link 20 an obliquely rearwards and downwards descending sliding section adjoins which ends in a lower, rear and end-side sliding section of the second rear control link 20. Said end-side rear sliding section is again extending horizontally, however, on a level in height below the front-side sliding section of the first rear control link 19, as apparent in FIG. 7. The deployment lever 15 is slidably guided in both the rear control links 19, 20. For that purpose, the front control pin 17 traverses the first rear control link 19 and is connected to the deployment lever 15 on a front pivot point 30. The rear control pin 17 traverses the second rear control link 20 and is connected to the deployment lever 15 on a rear pivot point 31. The control pins 17 are designed such that they constitute slidingly movable sliding blocks in the rear control links 19, 20. In order to prevent the control pins 17 from slipping out of the control links 19, 20 on the deployment lever 15 side, each control pin 17 is provided with a sliding head 29 on the end side remote from the deployment lever 15, with the diameter of the head being greater than a height of the respective passage slot of the respective rear control link 19, 20.

Both the rear control links 19, 20 include bearing surface enlargements 27, 28, embodied in sliding layers of the circumferential peripheral regions of the two passage slots of the rear control links 19, 20. The bearing surface enlargements 27, 28 extend laterally projecting towards the opposite longitudinal sides of the flat profiled section of the control carriage 8, whereby corresponding contact surfaces for the control pins 17 are increased. Said bearing surface enlargements 27 are obtained by injection molding about the passage slots in the flat profiled section using synthetic material. An appropriate synthetic material employed is POM.

Figure 5:
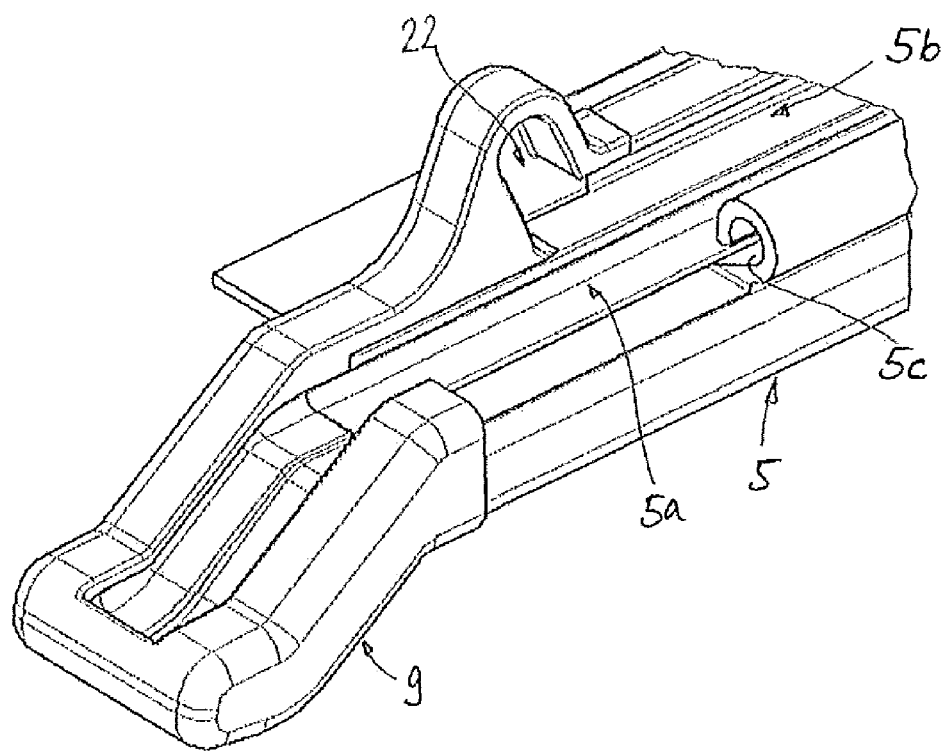
FIG. 5 shows a perspective view of a front portion of the guide track arrangement according to FIG. 3.
Figure 6:
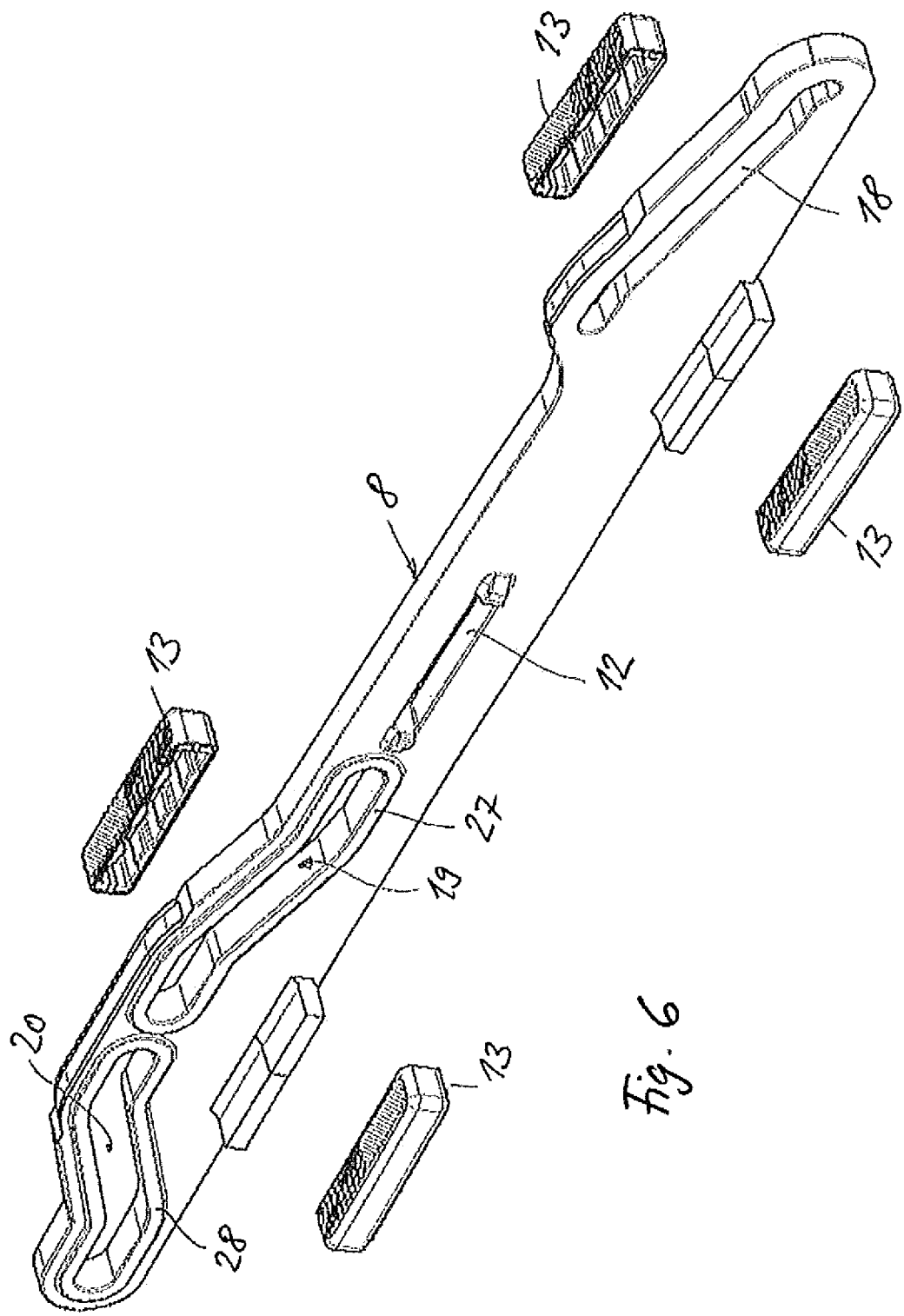
FIG. 6 shows a perspective exploded view of a guide carriage of the deployment and guide mechanism according to FIG. 3.
Figure 7:
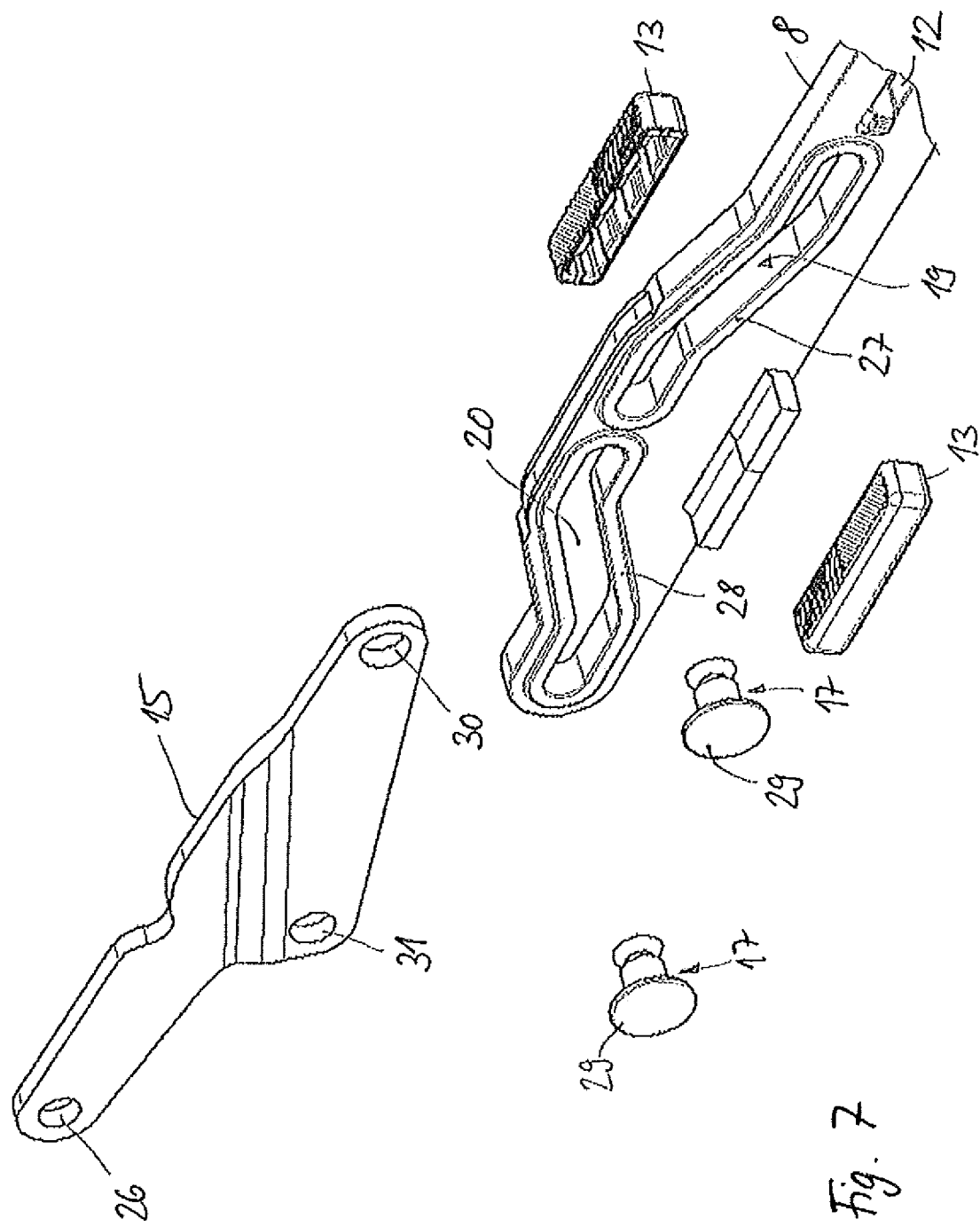
FIG. 7 shows an exploded view of a rear part of the deployment and guide mechanism according to FIG. 3.
Figure 8:
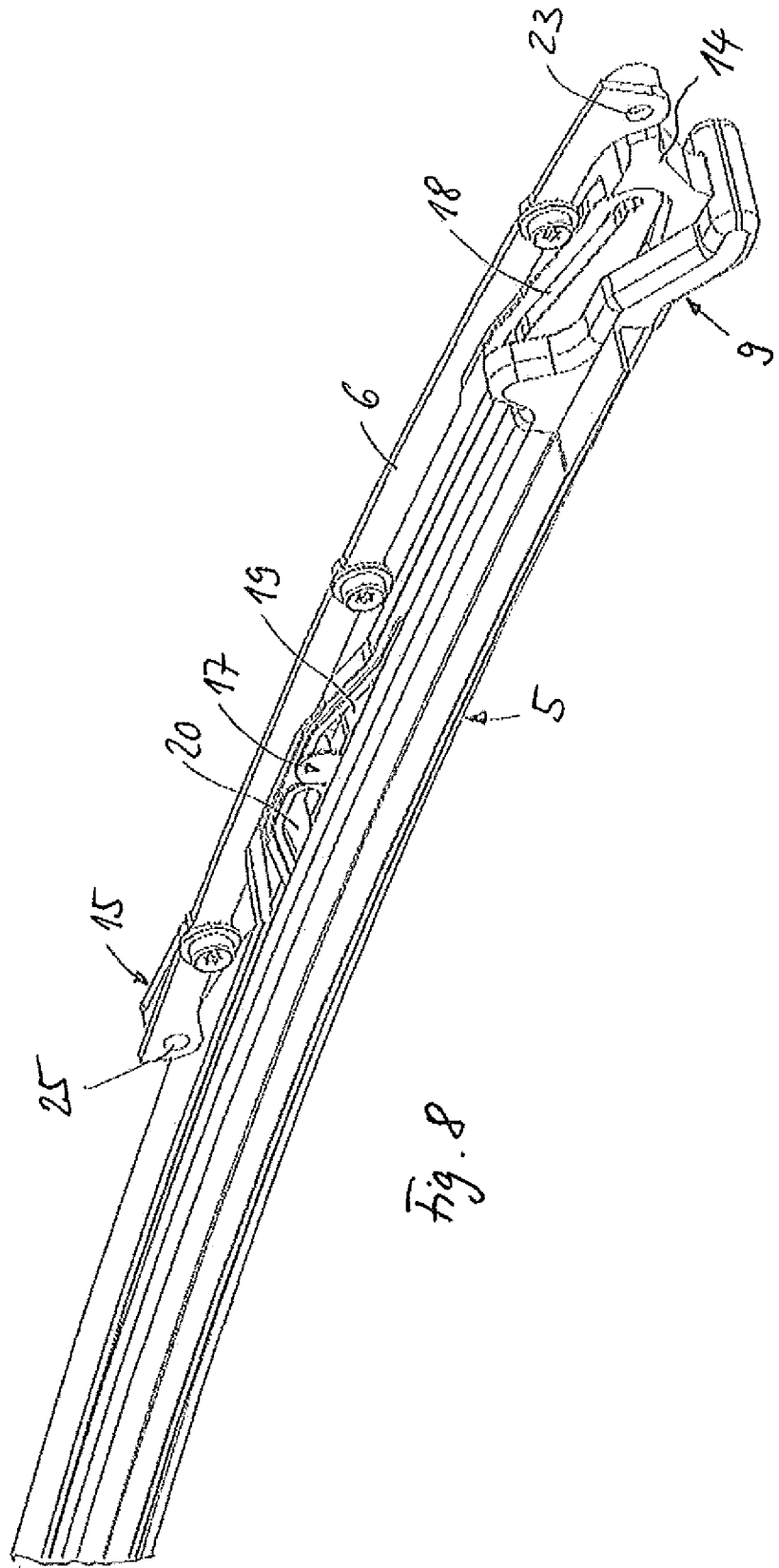
FIG. 8 shows the deployment and guide mechanism in the guide track arrangement in a closed position of the roof part.
Figure 9:
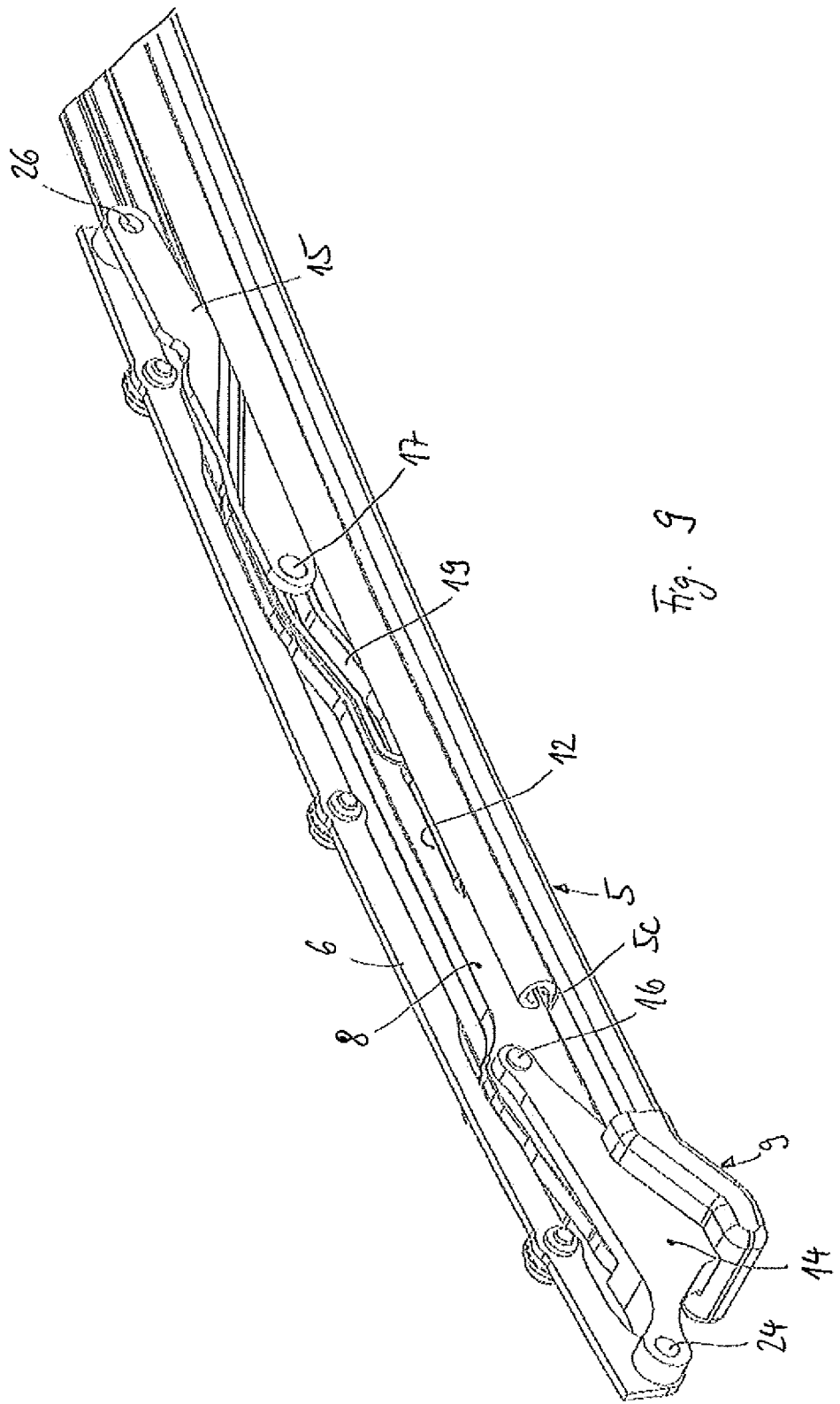
FIG. 9 shows the deployment and guide mechanism according to FIG. 8 in another perspective view.
Figure 10:
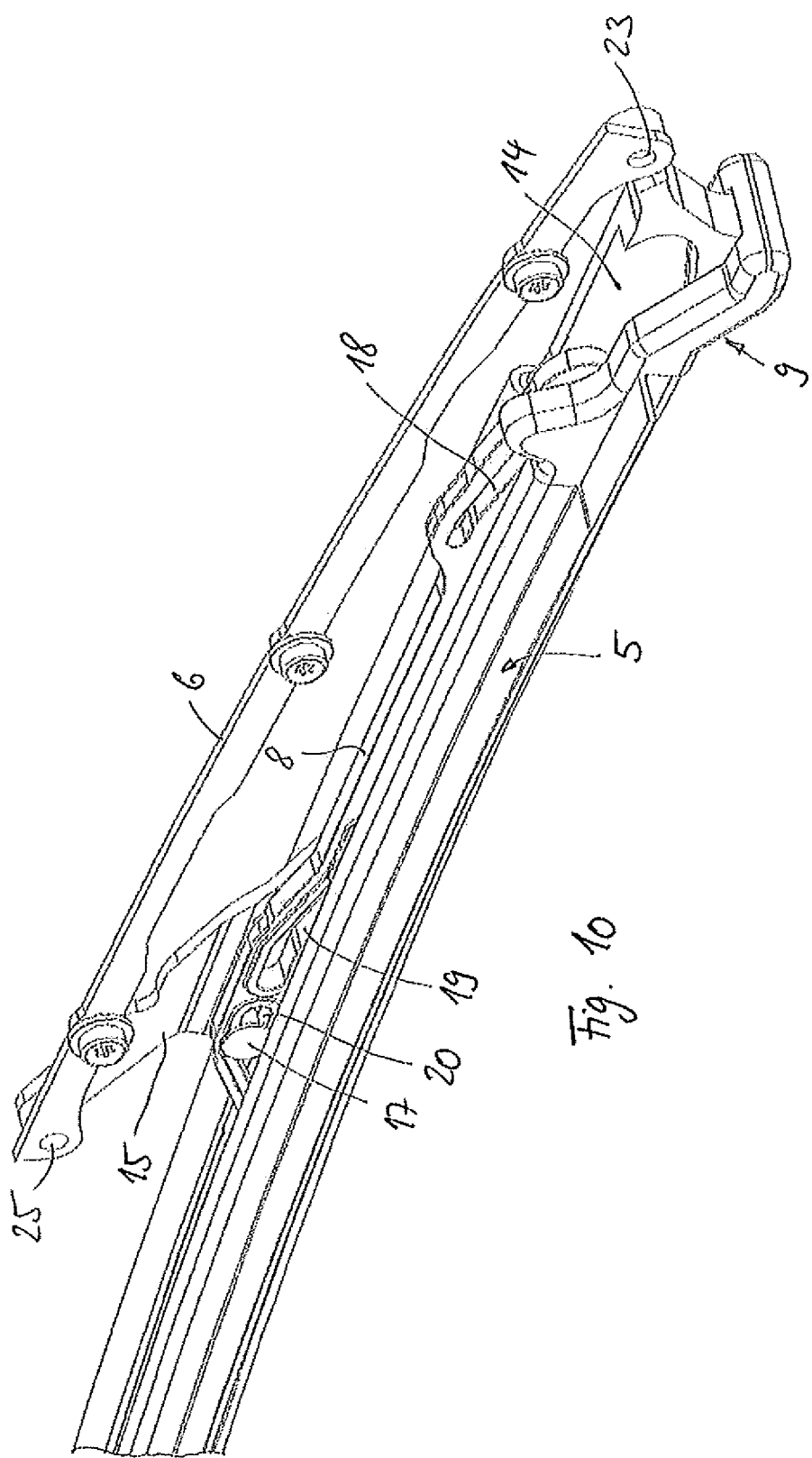
FIG. 10 shows the deployment and guide mechanism according to FIG. 8 in a ventilation position.
Figure 11:
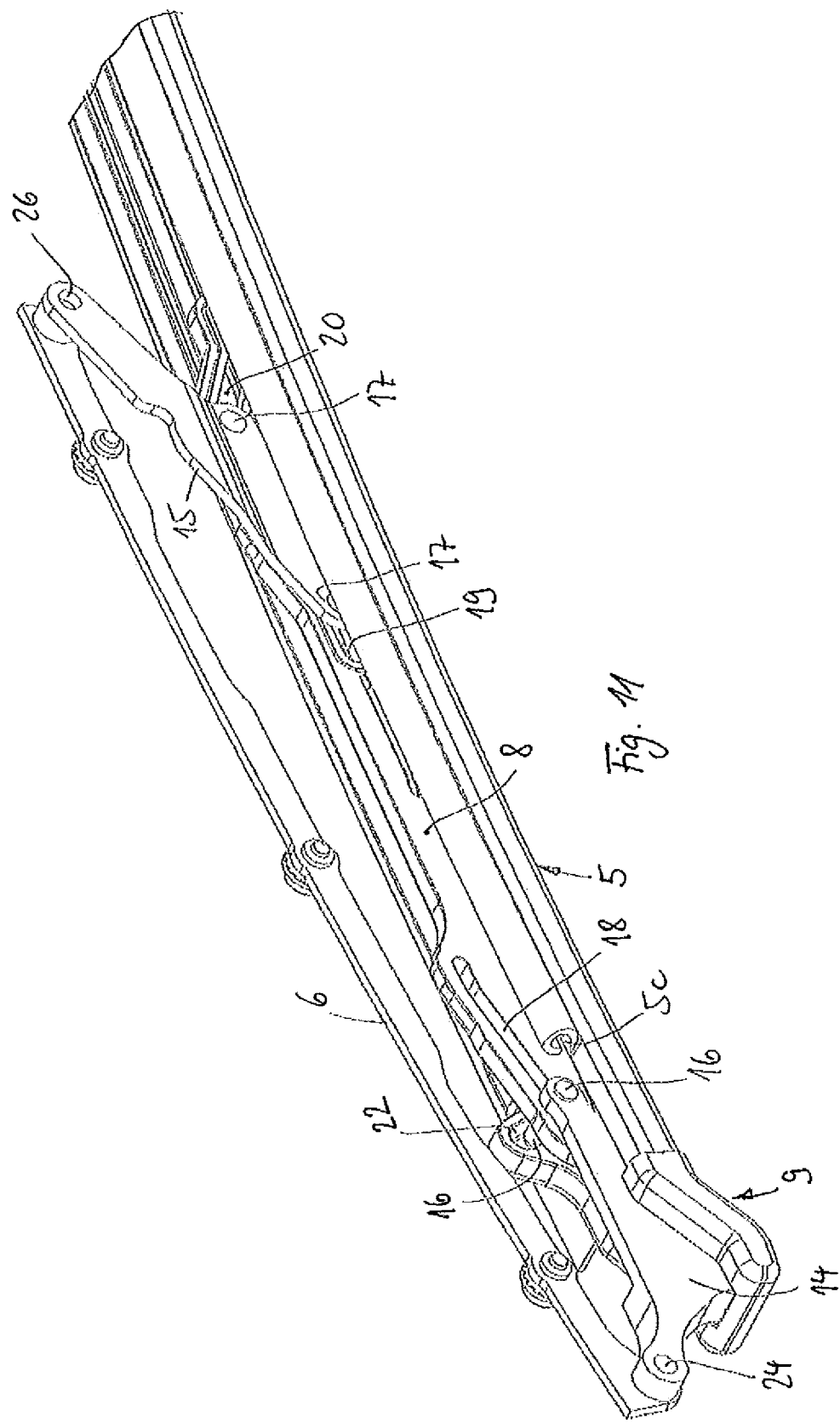
FIG. 11 shows the ventilation position of the deployment and guide mechanism according to FIG. 10 in another perspective view.

As is apparent in particular with reference to FIG. 5, the lifting slotted link 22 includes a blocking section which extends in the vertical direction and to a minor extent obliquely to the front, wherein the bearing pin 16 is captured in an initial condition. The blocking section is open at the bottom towards the track profile constituting the upper guide plane 5b of the guide track arrangement 5. In said initial location, the guide pin 21 of the front deployment lever 14 is positioned in the front end region of the sliding track of the guide extension 9. The control carriage 8 is in its front final position, wherein the bearing pin 16 abuts on a rear end region of the front control link 18. In said initial location, the movable roof part 2 is in its closed position, according to FIG. 1.

In order to transfer the roof part 2 from the closed position to a ventilation position, wherein the rear peripheral region of the movable roof part 2 is deployed obliquely upwards and protrudes beyond the surface of the stationary roof portion 4, the control carriage 8 is shifted to the rear by means of the drive transmission cable 10. Since the front deployment lever 14 is connected to the rear deployment lever 15 via the supporting strut 6, the flat profiled section of the control carriage 8 runs along the deployment lever 15, whereby the control pins 17 in the two rear control links 19, 20 are necessarily displaced within the two rear control links 19, 20 from the rear end sections of the two rear control links 19, 20 to the front. As a result, the deployment lever 15 is necessarily raised, since the rear control pin 17 in the second rear control link 20 is necessarily raised and the front control pin 17 in the first rear control link 19 is correspondingly lowered necessarily in the opposite direction. Said moving of the control carriage 8 to the rear also necessarily causes a displacement of the front control link 18 relative to the bearing pin 16 captured in the lifting slotted link 22. The front control link 18 is oriented over its length in an oblique and curved manner such that, upon starting the displacement move of the control carriage 8, the front deployment lever 14 is lowered in the vicinity of the rear bearing pin 16 thereof, whereby necessarily the front bearing point 23 of the roof part 2 and the front joint 24 of the deployment lever 14 are raised. As a result, there is a compensating movement of a roof front edge of the movable roof part 2, which is advantageous in particular with a curved design of the roof front edge and with the roof part 2 configured as a glass cover. Since the front control link 18, as is apparent with reference to FIG. 4, slopes downwards to the front the bearing pin 16 is necessarily displaced gradually downwards within the blocking section of the lifting slotted link 22, during a displacement of the control carriage 8 to the rear. However, the bearing pin 16 remains captured within the blocking section of the lifting slotted link for the time being until the deployment lever 15 has reached the ventilation position, wherein the rear peripheral region of the movable roof part 2 is deployed obliquely upwards. Upon a further displacement of the control carriage 8 to the rear, the oblique orientation of the front control link 18 forces the bearing pin 16 necessarily further downwards in the lifting slotted link 22, until abutment of the bearing pin 16 on the guide plane 5b. Now, the bearing pin 16 can be further entrained by the control carriage 8, whereby necessarily the guide pin 21 of the front deployment lever 14 is also displaced from the guide extension 9 to the rear. Thereby, the bearing point 23 of the supporting strut 6 is necessarily displaced upwards, whereby the supporting strut 6 is deployed upwards together with the movable roof part 2 not only at the rear, but also at the front. The supporting strut 6 is now deployed upwards far enough (cf. FIGS. 12 and 13) that the control carriage 8 is enabled to displace the two deployment levers 14 and 15 together with the supporting strut 6 to the rear. Consequently, the roof part 2 is shifted rearwards over the stationary roof portion 4 up to the open final position, as illustrated in FIG. 2. The ventilation position of the movable roof part and, therefore, of the corresponding supporting strut 6 is illustrated with reference to FIGS. 10 and 11. In contrast, the closed final position, i.e., the closed position of the roof part 2 is apparent with reference to FIGS. 8 and 9, since there the respective supporting strut 6 is shown in the lower final position corresponding to the closed position of the roof part 2.

An accordingly reversed closing procedure from the open final position is performed by simple displacing the drive transmission cable 10 to the front, whereby necessarily the control carriage 8 is shifted again to the front, whereby the above described moves of the deployment and guide mechanism occur in the reverse order.

The invention claimed is:

1. A roof system for an automotive vehicle, with a roof opening fixed to the vehicle and with a movably mounted roof part for closing and exposing the roof opening, and with at least one deployment and guide mechanism for displacing the roof part between a closed position and at least one open position, said mechanism includes a control carriage which is movable by a drive system in a guide track arrangement fixed to a roof, and said mechanism includes a front deployment lever and a rear deployment lever with the roof part mounted thereon, and said levers are coupled to the control carriage, wherein the front deployment lever is capable of being blocked relative to the rear deployment lever in a longitudinal direction of the guide track arrangement for a ventilation position of the roof part, wherein the control carriage has a front control link, in which a bearing pin of the front deployment lever is guided, wherein the bearing pin projects through the front control link into a lifting slotted link fixed to the roof, which extends in a parallel plane to the front control link and is oriented at least in sections crosswise in relation to the front control link, wherein the control carriage has two rear control links, in which at least one control pin of the rear deployment lever is guided, and wherein a first one of the two rear control links is positioned in front of a second one of the two rear control links along the longitudinal direction.

2. The roof system according to claim 1, wherein each of the two rear control links guides a respective one of the at least one control pin of the rear deployment lever.

3. The roof system according to claim 2, wherein the front control link and the two rear control links are oriented in a common plane of the control carriage.

4. The roof system according to claim 1, wherein the control carriage has a flat profiled section oriented in a vertical direction and the longitudinal direction of the guide track arrangement, and the front control link and the two rear control links are provided therein.

5. The roof system according to claim 1, wherein the control links are lengthwise passage slots extending in a planar, rising or falling manner, in response to a predetermined control path of the bearing pin of the front deployment lever or the corresponding one of the at least one control pin of the rear deployment lever in a plane of the control carriage.

6. The roof system according to claim 1, wherein the lifting slotted link includes a blocking section extending at least largely in a vertical direction, which intersects the front control link in such a manner that the bearing pin of the front deployment lever is held supported within the blocking section of the lifting slotted link by the front control link as long as the roof part is being transferred to the ventilation position.

7. The roof system according to claim 5, wherein the passage slots of the two rear control links are provided with bearing surface enlargements extending in a transverse direction, which enlargements provide an enlarged contact surface for the control pins.

8. The roof system according to claim 7, wherein the bearing surface enlargements are provided with a sliding layer.

9. The roof system according to claim 7, wherein the control pins are each provided with a sliding head in a vicinity of an end side facing away from the rear deployment lever, with a diameter of the heads being greater than a corresponding width of the respective passage slot of the rear control links.

10. A roof system for an automotive vehicle comprising:
   a roof opening fixed to the vehicle;
   a movably mounted roof part for closing and exposing the roof opening;
   at least one deployment and guide mechanism for displacing the roof part between a closed position and at least one open position;
   a guide track arrangement fixed to a roof of the vehicle;
   the at least one deployment and guide mechanism including a control carriage movable by a drive system;
   the at least one deployment and guide mechanism including a front deployment lever and a rear deployment lever with the roof part mounted thereon;
   the front deployment lever and the rear deployment lever being coupled to the control carriage, wherein the front deployment lever is capable of being blocked relative to the rear deployment lever in a longitudinal direction of the guide track arrangement for a ventilation position of the roof part;
   the control carriage having a front control slot and two rear control slots;
   a bearing pin of the front deployment lever is guided in the front control slot, the bearing pin projecting through the front control slot and into a lifting slot fixed to the roof;
   the lifting slot extending in a parallel plane to the front control slot and is oriented at least in sections crosswise in relation to the front control slot; and
   control pins of the rear deployment lever are guided in the two rear control slots;
   the two rear control slots extend through a single plane.

11. The roof system according to claim 10, wherein the lifting slot includes a blocking section extending at least largely in a vertical direction, which intersects the front control slot in such a manner that the bearing pin of the front deployment lever is held supported within the blocking section of the lifting slot by the front control slot as long as the roof part is being transferred to the ventilation position.

12. The roof system according to claim 10, wherein the two rear control slots extend through a planar plate.

13. The roof system according to claim 10, wherein the control pins extending into the two rear control slots are not co-linear.

14. The roof system according to claim 10, wherein a first one of the two rear control slots is located behind a second one of the two rear control slots in a direction from a front to a rear of the roof opening.

15. A roof system for an automotive vehicle comprising:
   a roof opening fixed to the vehicle;
   a movably mounted roof part for closing and exposing the roof opening;
   at least one deployment and guide mechanism for displacing the roof part between a closed position and at least one open position;
   a guide track arrangement fixed to a roof of the vehicle;
   the at least one deployment and guide mechanism including a control carriage movable by a drive system;

the at least one deployment and guide mechanism including a front deployment lever and a rear deployment lever with the roof part mounted thereon;

the front deployment lever and the rear deployment lever being coupled to the control carriage, wherein the front deployment lever is capable of being blocked relative to the rear deployment lever in a longitudinal direction of the guide track arrangement for a ventilation position of the roof part;

the control carriage having a front control slot and two rear control slots;

a bearing pin of the front deployment lever is guided in the front control slot, the bearing pin projecting through the front control slot and into a lifting slot fixed to the roof;

the lifting slot extending in a parallel plane to the front control slot and is oriented at least in sections crosswise in relation to the front control slot; and control pins of the rear deployment lever are guided in the two rear control slots;

a first one of the two rear control slots is located behind a second one of the two rear control slots in a direction from a front to a rear of the roof opening.

16. The roof system according to claim 15, wherein the lifting slot includes a blocking section extending at least largely in a vertical direction, which intersects the front control slot in such a manner that the bearing pin of the front deployment lever is held supported within the blocking section of the lifting slot by the front control slot as long as the roof part is being transferred to the ventilation position.

17. The roof system according to claim 15, wherein the two rear control slots extend through a planar plate.

18. The roof system according to claim 15, wherein the control pins extending into the two rear control slots are not co-linear.

* * * * *